US009328242B2

(12) United States Patent
Ogawa et al.

(10) Patent No.: US 9,328,242 B2
(45) Date of Patent: May 3, 2016

(54) POLYSILOXANE COMPOSITION AND CURED PRODUCT THEREOF

(75) Inventors: Takuya Ogawa, Chiba (JP); Kazusato Shibata, Tokyo (JP)

(73) Assignee: DOW CORNING TORAY CO., LTD., Chiyoda-ku, Tokyo (JP)

(*) Notice: Subject to any disclaimer, the term of this patent is extended or adjusted under 35 U.S.C. 154(b) by 0 days.

(21) Appl. No.: 13/819,220

(22) PCT Filed: Aug. 16, 2011

(86) PCT No.: PCT/JP2011/068570
§ 371 (c)(1),
(2), (4) Date: Mar. 26, 2013

(87) PCT Pub. No.: WO2012/029538
PCT Pub. Date: Mar. 8, 2012

(65) Prior Publication Data
US 2013/0178571 A1 Jul. 11, 2013

(30) Foreign Application Priority Data
Aug. 31, 2010 (JP) ................. 2010-194013

(51) Int. Cl.
C08K 3/34 (2006.01)
C08L 83/06 (2006.01)
C08L 83/04 (2006.01)
C08G 77/12 (2006.01)
C08G 77/20 (2006.01)
C08K 3/36 (2006.01)
C08K 7/18 (2006.01)
C08G 77/14 (2006.01)
C08K 3/22 (2006.01)

(52) U.S. Cl.
CPC ............ *C08L 83/06* (2013.01); *C08L 83/04* (2013.01); *C08G 77/12* (2013.01); *C08G 77/14* (2013.01); *C08G 77/20* (2013.01); *C08K 3/36* (2013.01); *C08K 7/18* (2013.01); *C08K 2003/2227* (2013.01); *C08K 2201/016* (2013.01)

(58) Field of Classification Search
CPC ............................ C08K 3/36; C08K 2201/016
See application file for complete search history.

(56) References Cited

U.S. PATENT DOCUMENTS

| 5,258,212 | A | * | 11/1993 | Tomaru et al. ............ 428/36.8 |
| 5,276,087 | A | | 1/1994 | Fujiki et al. |
| 6,784,555 | B2 | | 8/2004 | Watson |
| 7,425,351 | B2 | | 9/2008 | Chevalier et al. |
| 8,211,545 | B2 | | 7/2012 | Asaine |
| 2001/0050836 | A1 | * | 12/2001 | Tomaru et al. ............ 361/234 |
| 2005/0065275 | A1 | | 3/2005 | Takahashi et al. |
| 2007/0219312 | A1 | * | 9/2007 | David ............ 524/588 |
| 2007/0290202 | A1 | | 12/2007 | Matsumoto et al. |
| 2007/0293624 | A1 | | 12/2007 | Matsumoto et al. |
| 2008/0213578 | A1 | * | 9/2008 | Endo et al. ............ 428/334 |

FOREIGN PATENT DOCUMENTS

| JP | 05-105814 A | 4/1993 |
| JP | 07-292343 A | 11/1995 |
| JP | 08-311159 A | 11/1996 |
| JP | 2003-137627 A | 5/2003 |
| JP | 2005-503467 A | 2/2005 |
| JP | 2005-281509 A | 10/2005 |
| JP | 2006-503142 A | 1/2006 |
| JP | 2007-332104 A | 12/2007 |
| JP | 2008-019426 A | 1/2008 |
| JP | 2008-038137 A | 2/2008 |
| JP | 2008-260798 A | 10/2008 |
| JP | 2010-511738 A | 4/2010 |
| WO | WO 03029353 A1 | 4/2003 |
| WO | WO 2008/133211 A1 | 11/2008 |

OTHER PUBLICATIONS

English language abstract for JP 05-105814 extracted from the espacenet.com database on May 17, 2013, 8 pages.
English language abstract and machine-assisted English translation for JP 07-292343 extracted from the PAJ database on May 17, 2013, 48 pages.
English language abstract and machine-assisted English translation for JP 08-311159 extracted from the PAJ database on May 17, 2013, 35 pages.
English language abstract and machine-assisted English translation for JP 2003-137627 extracted from the PAJ database on May 16, 2013, 38 pages.

(Continued)

*Primary Examiner* — Margaret Moore
(74) *Attorney, Agent, or Firm* — Howard & Howard Attorneys PLLC

(57) ABSTRACT

The present invention relates to a polysiloxane composition which contains (A) at least one type of organopolysiloxane that contains at least two unsaturated aliphatic hydrocarbon groups in the molecule, (B) at least one type of organohydrogenpolysiloxane that contains at least two silicon-bonded hydrogen atoms in the molecule, (C) a hydrosilylation reaction catalyst, and (D) inorganic particles which have a major axis to minor axis ratio of 1 to 1.5 and in which the proportion of particles having a diameter of 50 μm or greater is 5 wt. % or less of the total quantity of particles, and which satisfies prescribed conditions. The polysiloxane composition of the present invention has good processability and can provide a hard cured product having an extremely low coefficient of thermal expansion after curing.

14 Claims, No Drawings

(56) References Cited

OTHER PUBLICATIONS

English language abstract and machine-assisted English translation for JP 2005-281509 extracted from the PAJ database on May 17, 2013, 25 pages.
English language abstract not available for JP 2005-503467; however, see English language equivalent U.S. Pat. No. 6,784,555. Original document extracted from the espacenet.com database on May 17, 2013, 43 pages.
English language abstract not available for JP 2006-503142; however, see English language equivalent U.S. Pat. No. 7,425,351. Original document extracted from the espacenet.com database on May 17, 2013, 18 pages.
English language abstract for JP 2007-332104 extracted from the espacenet.com database on May 17, 2013, 17 pages.
English language abstract for JP 2008-019426 extracted from the espacenet.com database on May 17, 2013, 22 pages.
English language abstract for JP 2008-038137 extracted from the espacenet.com database on May 17, 2013, 25 pages.
English language abstract for JP 2008-260798 extracted from the espacenet.com database on May 17, 2013, 17 pages.
English language abstract not available for JP 2010-511738; however, see English language equivalent US 2007/0219312. Orginal document extracted from the espacenet.com database on May 17, 2013, 14 pages.
English language abstract for WO 03029353 extracted from the espacenet.com database on May 17, 2013, 40 pages.
English language abstract for WO 2008/133211 extracted from the espacenet.com database on May 17, 2013, 20 pages.
International Search Report for Application No. PCT/JP2011/068570 dated Dec. 13, 2011, 5 pages.

* cited by examiner

POLYSILOXANE COMPOSITION AND CURED PRODUCT THEREOF

RELATED APPLICATIONS

This application is the National Stage of International Patent Application No. PCT/JP2011/068570, filed on Aug. 16, 2011, which claims priority to and all the advantages of Japanese Patent Application No. 2010-194013, filed on Aug. 31, 2010, the content of which is incorporated herein by reference.

TECHNICAL FIELD

The present invention relates to a polysiloxane composition having excellent heat resistance and moldability, and a cured product thereof.

BACKGROUND ART

The technique of charging inorganic particles such as silica, alumina, mica and talc in a polysiloxane-based material in order to improve the heat resistance of said material is widely used, but as the charged quantity of inorganic particles increases, heat resistance improves, but the processability and fluidity of said material deteriorates. Therefore, in order to ensure compatibility between properties of heat resistance and processability, Japanese Unexamined Patent Application Publication No. 2003-137627 and Japanese Unexamined Patent Application Publication (Translation of PCT Application) No. 2005-503467, for example, disclose controlling the shape and size of a charged inorganic material and blending spherical particles. In addition, Japanese Unexamined Patent Application Publication Nos. 2007-332104, 2008-19426 and 2008-38137, for example, disclose a method of treating the surface of inorganic particles with an appropriate material and dispersing in a polysiloxane at a high concentration. However, materials obtained using these techniques are not hard and are not suitable for use in high temperatures due to exhibiting high thermal expansion.

The era of extensive commercialization of power semiconductors such as SiC or GaN is approaching. The key to this commercialization is highly heat resistant sealing materials, but there is a need for materials which can withstand continuous use at temperatures of 200° C. or higher, do not undergo peeling from a substrate as a result of thermal history and exhibit low thermal expansion, which is expressed by the coefficient of linear expansion.

As a polysiloxane-based material that exhibits low thermal expansion, Japanese Unexamined Patent Application Publication (Translation of PCT Application) No. 2006-503142, for example, discloses a novel curable silicone resin. A cured product of this silicone resin exhibits lower thermal expansion than a cured product of a conventional silicone resin, but has a coefficient of linear expansion of approximately 100 ppm in the temperature range of room temperature to 100° C., and therefore still exhibits high thermal expansion. In addition, Japanese Unexamined Patent Application Publication (Translation of PCT Application) No. 2006-503142 merely discloses the coefficient of linear expansion up to a temperature of approximately 200° C.

Charging inorganic particles is important in order to maintain low thermal expansion in the high temperature region of 250° C. or higher. Japanese Unexamined Patent Application Publication No. H05-105814 discloses a composition obtained by blending spherical inorganic particles in a curable polysiloxane, but this composition becomes gel-like following curing, and therefore exhibits inadequate heat resistance and has a high coefficient of linear expansion. In addition, domestic re-publication No. 2003-29353 discloses a low thermal expansion material comprising an epoxy group-containing polysiloxane and spherical inorganic particles, but this material is a composition in which fluidity is ensured by using a solvent, and is therefore not suitable for use as a sealing material.

In addition, solid epoxy resins able to be transfer molded are well-known (for example, see Japanese Unexamined Patent Application Publication No. H08-311159), but because a highly viscous fluid is injected into a mold at high pressure, this method is not suitable for forming a compact shape or sealing an electronic component, many articles have low glass transition temperatures, and it cannot be said that the coefficient of linear expansion is satisfactory at temperatures higher than this.

Therefore, it is currently the case that there have been no reports of polysiloxane compositions which exhibit good processability and which give hard materials having extremely low coefficients of linear expansion following curing, or of cured products thereof having low thermal expansion.

PRIOR ART DOCUMENTS

Patent Documents

Patent Document 1: Japanese Unexamined Patent Application Publication No. 2003-137627A
Patent Document 2: Japanese Unexamined Patent Application Publication (Translation of PCT Application) No. 2005-503467A
Patent Document 3: Japanese Unexamined Patent Application Publication No. 2007-332104A
Patent Document 4: Japanese Unexamined Patent Application Publication No. 2008-19426A
Patent Document 5: Japanese Unexamined Patent Application Publication No. 2008-38137A
Patent Document 6: Japanese Unexamined Patent Application Publication (Translation of PCT Application) No. 2006-503142A
Patent Document 7: Japanese Unexamined Patent Application Publication No. H-05-105814A
Patent Document 8: Domestic re-publication No. 2003-29353
Patent Document 9: Japanese Unexamined Patent Application Publication No. H-08-311159A

SUMMARY OF INVENTION

Technical Problem

An object of the present invention is to provide a polysiloxane composition which has good processability and which gives a hard cured product having an extremely low coefficient of thermal expansion after curing, and a cured product thereof.

Solution to Problem

The object of the present invention is achieved by a polysiloxane composition which comprises (A) at least one type of organopolysiloxane that contains at least two unsaturated aliphatic hydrocarbon groups in the molecule,
(B) at least one type of organohydrogenpolysiloxane that contains at least two silicon-bonded hydrogen atoms in the molecule, (C) a hydrosilylation reaction catalyst, and
(D) inorganic particles which have a major axis to minor axis ratio of 1 to 1.5 and in which the proportion of particles having a diameter of 50 μm or greater is 5 wt. % or less of the total quantity of particles,
wherein
a weight fraction of the unsaturated aliphatic hydrocarbon groups in the organopolysiloxane (A) is from 0.5 to 10 wt. %,
a compounding ratio of the inorganic particles (D) in the polysiloxane composition is from 55 to 85 vol. %,
a value of [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.04 to 8, and
the viscosity of the polysiloxane composition at 25° C. is 500 Pa·s or less.

The viscosity of the organopolysiloxane (A) at 25° C. is preferably from 0.05 to 20 Pa·s.

The weight fraction of the silicon-bonded hydrogen atoms in the organohydrogenpolysiloxane (B) is preferably 0.1 wt. % or greater.

The viscosity at 25° C. of the organohydrogenpolysiloxane (B) is preferably 0.1 Pa·s or less.

The value of [the weight fraction of the unsaturated aliphatic hydrocarbon groups in the organopolysiloxane (A)]×[the weight fraction of the silicon-bonded hydrogen atoms in the organohydrogenpolysiloxane (B)] is preferably from 0.1 to 7.

The value of [the weight fraction of the unsaturated aliphatic hydrocarbon groups in the organopolysiloxane (A)]×[the weight fraction of the silicon-bonded hydrogen atoms in the organohydrogenpolysiloxane (B)] is more preferably from 0.5 to 4.5.

A value of [the number of moles of the silicon-bonded hydrogen atoms in the organohydrogenpolysiloxane (B)]/[the number of moles of the unsaturated aliphatic hydrocarbon groups in the organopolysiloxane (A)] is preferably from 0.5 to 1.5.

The hydrosilylation reaction catalyst (C) is preferably a platinum metal-type catalyst.

The inorganic particles (D) preferably contain at least one type of metal oxide particles.

The metal oxide particles are preferably silica.

It is preferable for the polysiloxane composition of the present invention to further contain at least one type of adhesion-imparting agent (E).

It is preferable for the polysiloxane composition of the present invention to contain no solvent.

The polysiloxane composition of the present invention can provide a cured product having a coefficient of linear expansion at 30 to 300° C. of $80 \times 10^{-6}$/K or less, and preferably $50 \times 10^{-6}$/K or less.

The present invention also relates to a cured product obtained by curing the above-mentioned polysiloxane composition.

Advantageous Effects of Invention

Despite containing a relatively high quantity of inorganic particles, the polysiloxane composition of the present invention has good processability due to having a low viscosity, and can give a hard cured product having an extremely low coefficient of thermal expansion after curing.

In particular, in cases where the polysiloxane composition of the present invention contains no solvent, there are no concerns regarding solvents altering a substrate, electronic material and the like, and there is no occurrence of voids caused by solvent in the cured product or cracks in the cured product caused by solvent evaporation. Therefore, the polysiloxane composition of the present invention can be advantageously used as a sealing material for a semiconductor and the like.

In addition, the cured product of the present invention has a coefficient of linear expansion at 30 to 300° C. of $100 \times 10^{-6}$/K or less, preferably $70 \times 10^{-6}$/K or less, and more preferably $50 \times 10^{-6}$/K or less, has an extremely low coefficient of expansion, and can maintain satisfactory hardness. Therefore, the cured product of the present invention can be continuously used for a long period of time even in an environment where temperatures exceed 200° C. and does not peel from a substrate and the like, and is therefore particularly suitable for sealing a power semiconductor.

DESCRIPTION OF EMBODIMENTS

Component (A)

The at least one type of organopolysiloxane containing at least two unsaturated aliphatic hydrocarbon groups in the molecule (A) is not limited in terms of structure as long as at least two unsaturated aliphatic hydrocarbon groups are contained in the molecule (A), and can be, for example, a straight chain, branched chain or net-like organopolysiloxane. The positions of the aliphatic unsaturated hydrocarbon groups in the organopolysiloxane are not limited, and can be on the main chain or at a terminal. Component (A) may be a single component, but may also be a mixture of two or more organopolysiloxanes having different structures.

The unsaturated aliphatic hydrocarbon groups in component (A) preferably have from 2 to 20 carbons. Examples of the monovalent unsaturated aliphatic hydrocarbon group having from 2 to 20 carbons include straight chain or branched chain alkenyl groups such as vinyl groups, 1-propenyl groups, allyl groups, isopropenyl groups, 1-butenyl groups, 2-butenyl groups, pentenyl groups, hexenyl groups, and the like; cycloalkenyl groups such as cyclopentenyl groups, cyclohexenyl groups, and the like; and, furthermore, cycloalkenylalkyl groups such as cyclopentenylethyl groups, cyclohexenylethyl groups, cyclohexenylpropyl groups, and the like. Alkenyl groups are preferred, and vinyl groups and hexenyl groups are particularly preferred.

Groups bonded to silicon atoms, other than the unsaturated aliphatic hydrocarbon groups, in component (A) are substituted or unsubstituted monovalent hydrocarbon groups or monovalent organic groups having reactive functional groups.

Substituted or unsubstituted monovalent hydrocarbon groups are typically substituted or unsubstituted monovalent saturated hydrocarbon groups having from 1 to 20 carbons, preferably from 1 to 10 carbons, and more preferably from 1 to 4 carbons, and substituted or unsubstituted monovalent aromatic hydrocarbon groups having from 6 to 20 carbons, and more preferably from 6 to 12 carbons. Moreover, component (A) may contain, as a monovalent organic group, a hydroxyl group or an alkoxy group having from 1 to 12 carbons, such as a methoxy group, an ethoxy group, a propoxy group or a butoxy group.

Examples of the monovalent saturated hydrocarbon group having from 1 to 20 carbons include straight chain or branched chain alkyl groups such as methyl groups, ethyl groups, n-propyl groups, isopropyl groups, n-butyl groups, isobutyl groups, sec-butyl groups, tert-butyl groups, pentyl groups, hexyl groups, heptyl groups, octyl groups, nonyl groups, decyl groups, and the like; and cycloalkyl groups such as cyclopentyl groups, cyclohexyl groups, cycloheptyl groups, cyclooctyl groups, and the like.

Examples of the monovalent aromatic hydrocarbon group having from 6 to 20 carbons include aryl groups such as phenyl groups, tolyl groups, xylyl groups, mesityl groups, and the like. Of these, a phenyl group is preferable. Note that, in the present specification, "aromatic hydrocarbon group" also includes groups in which an aromatic hydrocarbon and a saturated aliphatic hydrocarbon are conjugated in addition to groups formed only from an aromatic hydrocarbon. Examples of groups in which an aromatic hydrocarbon and a saturated hydrocarbon are conjugated include aralkyl groups such as benzyl groups, phenethyl groups, and the like.

Hydrogen atoms in the above-mentioned monovalent hydrocarbon groups may be substituted by one or more substituted groups, and said substituted groups may be selected from the group consisting of, for example, a halogen atom (a fluorine atom, a chlorine atom, a bromine atom, or an iodine atom), a hydroxyl group, an amide group, an ester group, a carboxyl group and an isocyanate group. A monovalent saturated or aromatic hydrocarbon group having at least one of the above-mentioned substituted groups is preferred. Specifically, it is possible to use a 3,3,3-trifluoropropyl group, a 3-chloropropyl group, a 3-hydroxypropyl group, a 3-(2-hydroxyethoxy)propyl group, a 3-carboxypropyl group, a 10-carboxydecyl group, a 3-isocyanatopropyl group and the like.

Examples of monovalent organic groups having reactive functional groups include monovalent saturated or aromatic hydrocarbon groups having reactive functional groups selected from the group consisting of, for example, hydroxyl groups, mercapto groups, epoxy groups, amino groups, amide groups, ester groups, carboxyl groups and isocyanate groups. One or a plurality of reactive functional groups may exist in the monovalent organic group. $R^1$ is preferably a monosaturated or aromatic hydrocarbon group having at least one of the reactive functional groups described above. Specific examples of the reactive functional group include 3-hydroxypropyl groups, 3-(2-hydroxyethoxy)propyl groups, 3-mercaptopropyl groups, 2,3-epoxypropyl groups, 3,4-epoxybutyl groups, 4,5-epoxypentyl groups, 2-glycidoxyethyl groups, 3-glycidoxypropyl groups, 4-glycidoxybutyl groups, 2-(3,4-epoxycyclohexyl)ethyl groups, 3-(3,4-epoxycyclohexyl)propyl groups, aminopropyl groups, N-methylaminopropyl groups, N-butylaminopropyl groups, N,N-dibutylaminopropyl groups, 3-(2-aminoethoxy)propyl groups, 3-(2-aminoethylamino)propyl groups, 3-carboxypropyl groups, 10-carboxydecyl groups, 3-isocyanate propyl groups, and the like.

Component (A) is preferably a straight chain or branched chain polysiloxane, but may contain a small quantity of a cyclic methylvinylpolysiloxane. A straight chain polysiloxane of component (A) is preferably a polymer that contains a diorganosiloxane unit and a triorganosiloxane unit, examples of which include dimethylpolysiloxanes capped at both molecular terminals with dimethylvinylsiloxy groups, copolymers of dimethylsiloxane and methylphenylsiloxane capped at both molecular terminals with dimethylvinylsiloxy groups, copolymers of dimethylsiloxane and methylvinylsiloxane capped at both molecular terminals with dimethylvinylsiloxy groups, copolymers of dimethylsiloxane and methylvinylsiloxane capped at both molecular terminals with trimethylsiloxy groups, copolymers of dimethylsiloxane, methylvinylsiloxane and methylphenylsiloxane capped at both molecular terminals with trimethylsiloxy groups, copolymers of dimethylsiloxane and methylvinylsiloxane capped at both molecular terminals with silanol groups, methylvinylpolysiloxanes capped at both molecular terminals with silanol groups, polymers in which some of the methyl groups in these polymers are substituted by alkyl groups other than methyl groups, such as ethyl groups or propyl groups, or halogenated alkyl groups such as 3,3,3-trifluoropropyl groups, and mixtures of two or more of these polymers, with diorganopolysiloxanes having unsaturated aliphatic hydrocarbon groups, and especially alkenyl groups, at both molecular terminals only being particularly preferred.

It is particularly preferable for a branched chain polysiloxane of component (A) to be a polymer that contains a diorganosiloxane unit, an organosilsesquioxane unit and a triorganosiloxy unit. Silicon-bonded organic groups in these units are preferably monovalent hydrocarbon groups including alkyl groups such as methyl groups, ethyl groups and propyl groups; alkenyl groups such as vinyl groups, allyl groups, butenyl groups and hexenyl groups; aryl groups such as phenyl groups and tolyl groups; and halogenated alkyl groups such as 3,3,3-trifluoropropyl groups, and the like, and may contain small quantities of hydroxyl groups and alkoxy groups such as methoxy groups, but at least two silicon-bonded organic groups in this polymer must be unsaturated aliphatic hydrocarbon groups, and especially alkenyl groups. In addition, the proportions of these units are not limited, but in this polymer, it is preferable for diorganosiloxane units to account for in the range of 80.00 to 99.65 mol % and organosilsesquioxane units to account for in the range of 0.10 to 10.00 mol %, with the balance comprising triorganosiloxy units.

The viscosity of component (A) will now be explained. In cases where component (A) is a mixture of two or more types of organopolysiloxane, the viscosity of component (A) means the viscosity of the mixture. The viscosity is measured using a commonly used method, such as a method that uses a rheometer, a rotational viscometer and the like, but it is recommended to use a viscosity obtained at a shear rate of $10\,s^{-1}$ using the method disclosed in JIS K 7117-2. This value is preferably 0.05 Pa·s or greater and 20 Pa·s or less at 25° C. in order to maintain good processability and mechanical strength in the polysiloxane composition. The mechanical strength of the polysiloxane composition is inadequate if this value is less than 0.05 Pa·s, and there are concerns regarding a deterioration in processability of the polysiloxane composition if this value exceeds 20 Pa·s. A preferred viscosity range is 0.1 Pa·s or greater and 10 Pa·s or less at 25° C.

The weight fraction of the unsaturated aliphatic hydrocarbon groups in component (A) will now be explained. In cases where component (A) is a mixture of two or more types of organopolysiloxane, the weight fraction of the unsaturated aliphatic hydrocarbon groups in component (A) means the weight fraction of the unsaturated aliphatic hydrocarbon groups in the mixture. The weight fraction expresses the content of unsaturated aliphatic hydrocarbon groups in component (A), and the value thereof is 0.5 wt. % or greater and 10 wt. % or less. If the weight fraction of the unsaturated aliphatic hydrocarbon groups in component (A) falls outside this range, it is difficult to control the coefficient of linear expansion of a cured product of the polysiloxane composition to a desired value and there are concerns that the cured product will be brittle. A preferred range for this weight fraction is 0.8 wt. % or greater and 10 wt. % or less, and a more preferred range is 1 wt. % or greater and 7 wt. % or less.

The compounded amount of component (A) in the composition of the present invention is dependent on component (B), which is described below, and is not particularly limited as long as [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.04 to 8, but is preferably from 1 to 20 mass (weight) % or from 5 to 10 mass (weight) % of the composition.

Component (B)

The at least one type of organohydrogenpolysiloxane containing two or more silicon-bonded hydrogen atoms in the molecule of component (B) is not particularly limited as long as two or more silicon-bonded hydrogen atoms are contained in the molecule, and can be, for example, a straight chain, branched chain or net-like organohydrogenpolysiloxane. The positions of the silicon-bonded hydrogen atoms in the organohydrogenpolysiloxane is not limited, and can be on the main chain or at the terminals. Component (B) may be a single component, but may also be a combination of two or more organohydrogenpolysiloxanes having different structures.

Examples of component (B) include 1,1,3,3-tetramethyldisiloxane, 1,3,5,7-tetramethylcyclotetrasiloxane, methylhydrogenpolysiloxanes capped at both molecular terminals with trimethylsiloxy groups, copolymers of dimethylsiloxane and methyl hydrogen siloxane capped at both molecular terminals with trimethylsiloxy groups, dimethylpolysiloxane capped at both molecular terminals with dimethylhydrogensiloxy groups, copolymers of dimethylsiloxane and methylhydrogensiloxane capped at both molecular terminals with dimethylhydrogensiloxy groups, copolymers of methylhydrogensiloxane and diphenylsiloxane capped at both molecular terminals with trimethylsiloxy groups, copolymers of methylhydrogensiloxane, diphenylsiloxane and dimethylsiloxane capped at both molecular terminals with trimethylsiloxy groups, copolymers comprising a $(CH_3)_2HSiO_{1/2}$ unit and a $SiO_{4/2}$ unit, and copolymers comprising a $(CH_3)_2HSiO_{1/2}$ unit, a $SiO_{4/2}$ unit and a $(C_6H_5)SiO_{3/2}$ unit.

The viscosity of component (B) will now be explained. In cases where component (B) is a mixture of two or more types of organohydrogenpolysiloxane, the viscosity of component (B) means the viscosity of the mixture. The viscosity is measured using a commonly used method, such as a method that uses a rheometer, a rotational viscometer and the like, but it is recommended to use a viscosity obtained at a shear rate of 10 $s^{-1}$ using the method disclosed in JIS K 7117-2. The viscosity of component (B) is preferably 0.1 Pa·s or less at 25° C. in order to maintain good processability and mechanical strength in the polysiloxane composition. There are concerns regarding a deterioration in processability of the polysiloxane composition if this value exceeds 0.1 Pa·s at 25° C. A preferred viscosity range is 0.05 Pa·s or less at 25° C.

The weight fraction of silicon-bonded hydrogen atoms in component (B) will now be explained. In cases where component (B) is a mixture of two or more types of organohydrogenpolysiloxane, the weight fraction of silicon-bonded hydrogen atoms in component (B) means the weight fraction of silicon-bonded hydrogen atoms in the mixture. The weight fraction expresses the content of silicon-bonded hydrogen atoms in component (B), and the value thereof is preferably 0.1 wt. % or greater. If the weight fraction of silicon-bonded hydrogen atoms in component (B) falls outside this range, there are concerns that it will be difficult to control the coefficient of linear expansion of a cured product of the polysiloxane composition to a desired value. A preferred range for this weight fraction is 0.15 wt. % or greater, and a more preferred range is 0.2 wt. % or greater.

In the polysiloxane composition of the present invention, the value of [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.04 to 8. The coefficient of linear expansion of a cured product of the polysiloxane composition is not sufficiently reduced if this value is less than 0.04, and a cured product of the polysiloxane composition is extremely brittle, which is not desirable, if this value exceeds 8. A preferred range for this value is 0.1 or greater and 7 or less, a more preferred range is 0.5 or greater and 4.5 or less, and an even more preferred range is 1 or greater and 4.5 or less.

The value of [the number of moles of the silicon-bonded hydrogen atoms in the organohydrogenpolysiloxane (B)]/[the number of moles of the unsaturated aliphatic hydrocarbon groups in the organopolysiloxane (A)] is preferably from 0.5 to 1.5 in the polysiloxane composition of the present invention. If this value falls outside this range, there are concerns that curing will be insufficient and a deterioration in storage stability will occur due to degradation of residual reactive groups. A more preferred range is 0.5 or greater and 1.4 or less, and an even more preferred range is 0.7 or greater and 1.3 or less.

The compounded amount of component (B) in the composition of the present invention is dependent on component (A), and is not particularly limited as long as [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.04 to 8, but can be from 1 to 10 mass (weight) % or from 2 to 5 mass (weight) % of the composition.

Component (C)

Component (C) is a hydrosilylation reaction catalyst, and is a catalyst used to facilitate an addition reaction of silicon-bonded hydrogen atoms in component (B) to unsaturated aliphatic hydrocarbon groups in component (A) and cure the polysiloxane composition of the present invention. Examples of component (C) include platinum-based catalysts such as chloroplatinic acid, alcohol solutions of chloroplatinic acid, olefin complexes of platinum, complexes of platinum and 1,3-divinyl-1,1,3,3-tetramethyldisiloxane and platinum-supported powders; palladium-based catalysts such as tetrakis (triphenylphosphine) palladium, palladium black and mixtures with triphenylphosphine; and rhodium-based catalysts, with platinum metal-type catalysts such as platinum-based catalysts and palladium-based catalysts being preferred, and platinum-based catalysts being more preferred.

The compounded amount of component (C) is a catalytic quantity, and in cases where a platinum-based catalyst is used as component (C), the compounded amount of component (C) is such that the content of platinum metal in the catalyst is from 0.01 to 1000 ppm, and especially from 0.1 to 500 ppm, by weight in the polysiloxane composition of the present invention for practical reasons.

Component (D)

Component (D) comprises inorganic particles having a major axis to minor axis ratio of 1 or greater and 1.5 or less. Here, the major axis to minor axis ratio is the [long axis]/[short axis] ratio of the particles, as measured using a microscope such as a scanning electron microscope. If this ratio exceeds 1.5, the processability of the obtained polysiloxane composition significantly deteriorates, which is not desirable. The major axis to minor axis ratio is preferably 1.2 or less, more preferably 1.1 or less, and even more preferably 1.0. Therefore, spherical inorganic particles are preferred. In addition, the proportion of particles having diameters of 50 µm or greater is 5 wt. % or less of the total quantity of particles in component (D). Here, particle diameter means the long axis of a particle, as measured using a laser scattering/diffraction type particle size distribution measurement apparatus and the like. If this proportion exceeds 5 wt. %, the uniformity of the composition is easily lost, which is not desirable.

The compounding ratio of component (D) is from 55 to 85 vol. %, and more preferably from 60 to 85 vol. %, of the total quantity of the polysiloxane composition of the present invention. If this compounding ratio is less than 55 vol. %, it is not possible to achieve both low thermal expansion after curing and good processability before curing, which is not desirable. In cases where the coefficient of linear expansion is to be 60 ppm/K or less, the compounded amount of component (D) is preferably from 70 to 85 vol. %, and more preferably from 75 to 82 vol. %. In terms of weight percentage, the compounded amount of component (D) is preferably from 60 to 95 wt. %, and more preferably from 75 to 90 wt. %.

Component (D) may be one type of inorganic particles, but may also be a mixture of two or more types of inorganic particles. The material of the inorganic particles is not particularly limited as long as the material is inorganic, but is preferably a metal oxide. Therefore, it is preferable for the inorganic particles of component (D) to contain at least one type of metal oxide particles. Examples of metal oxides include silica, alumina, titania, zirconia, talc, glass and zinc oxide, but silica is preferred from the perspectives of heat resistance, processability and economy. It is particularly preferable for component (D) to contain 90 wt. % or greater of silica.

Optional Components

In addition to the above-mentioned components (A) to (D), a variety of publicly known additives may be blended in the polysiloxane composition of the present invention according to need. For example, an adhesion-imparting agent (E) may be blended in order to impart adhesion to the composition. The adhesion-imparting agent is preferably a straight chain or cyclic polysiloxane containing, in the molecule, at least two types of reactive group selected from among silicon-bonded hydrogen atoms, silicon-bonded alkenyl groups (for example, vinyl groups), silicon-bonded alkoxy groups, silicon-bonded epoxy group-containing organic groups and silicon-bonded acrylic group-containing organic groups. Specific examples of adhesion-imparting agents include acryloxy group-containing organoalkoxysilanes such as 3-methacryloxypropyltrimethoxysilane and 3-acryloxypropyltrimethoxysilane; silane coupling agents such as epoxy group-containing organoalkoxysilanes, such as 3-glycidoxypropyltrimethoxysilane; and condensation reaction products of γ-glycidoxypropyltrialkoxysilanes and dimethylpolysiloxanes capped at molecular terminals with silanol groups, condensation reaction products of γ-glycidoxypropyltrialkoxysilanes and methylvinylpolysiloxanes capped at molecular terminals with silanol groups, and condensation reaction products of γ-glycidoxypropyltrialkoxysilanes and copolymers of dimethylsiloxane and methylvinylsiloxane capped at molecular terminals with silanol groups. The compounded amount of the adhesion-imparting agent is not particularly limited, but is preferably from 0.2 to 3 wt. % relative to the total quantity of the polysiloxane composition in order to achieve a satisfactory adhesion-imparting effect. If this compounded amount falls outside this range, there are concerns that adhesion following curing will be insufficient or that the low thermal expansion properties will be lost.

The polysiloxane composition of the present invention may contain a reaction inhibitor in order to improve the storage stability, handlability and workability of the composition. Examples of reaction inhibitors include alkyne alcohols such as 2-methyl-3-butyne-2-ol, 3,5-dimethyl-1-hexyne-3-ol, 2-phenyl-3-butyne-2-ol and 1-ethynyl-1-cyclohexanol; enyne compounds such as 3-methyl-3-penten-1-yne or 3,5-dimethyl-3-hexen-1-yne; 1,3,5,7-tetramethyl-1,3,5,7-tetravinylcyclotetrasiloxane, 1,3,5,7-tetramethyl-1,3,5,7-tetrahexenylcyclotetrasiloxane and benzotriazoles. The compounded amount of the reaction inhibitor is not limited, but is preferably in the range of 0.0001 to 5 wt. % relative to the total quantity of the polysiloxane composition of the present invention.

It is preferable for the polysiloxane composition of the present invention to contain no solvent. Examples of solvents include alcohol-based solvents such as methanol and ethanol, ether-based solvents such as ethylene glycol monomethyl ether, ketone-based solvents such as acetone, methyl ethyl ketone and methyl isobutyl ketone, amide-based solvents such as N,N-dimethylformamide, aromatic hydrocarbon-based solvents such as toluene and xylene, ester-based solvents such as ethyl acetate, and nitrile-based solvents such as butyronitrile. In cases where the polysiloxane composition of the present invention contains no solvent, it is possible to reduce the processing time due to drying not being required after the curing. In particular, in cases where the polysiloxane composition of the present invention contains no solvent and is used as a sealing material for a semiconductor and the like, there are no concerns regarding solvents altering a substrate, electronic material and the like, and there is no occurrence of voids caused by solvent in the cured product or cracks in the cured product caused by solvent evaporation.

The polysiloxane composition of the present invention can be produced by mixing components (A), (B), (C) and (D). The method for mixing components (A), (B), (C) and (D) is not limited, and it is possible to use a publicly known mixing method, such as a ribbon blender, a planetary centrifugal mixer or a pulverizing and mixing machine. The order of mixing is not limited, and it is possible to mix all of the above-mentioned components at once, but it is also possible to blend two or three of the components in advance and then mix the remaining components. In addition, the temperature during the mixing is not particularly limited, and is selected as appropriate within the range of room temperature to 200° C. For example, superior mixing can sometimes be achieved by blending components (A) and (D) or components (B) and (D) in advance while heating to 50 to 150° C. and then mixing the remaining components.

The viscosity of the polysiloxane composition of the present invention at 25° C. is 500 Pa·s or less, preferably from 0.05 to 400 Pa·s, more preferably from 0.1 to 300 Pa·s, and even more preferably from 1 to 200 Pa·s. The viscosity is measured using a commonly used method, such as a method that uses a rheometer, a rotational viscometer and the like, but it is recommended to use a viscosity obtained at a shear rate of 10 $s^{-1}$ using the method disclosed in JIS K 7117-2. If the viscosity exceeds 500 Pa·s, handlability and processability deteriorate.

The polysiloxane composition of the present invention is such that curing occurs either at room temperature or under heating, but it is preferable to heat the composition in order to achieve rapid curing. The heating temperature is preferably 300° C. or less, and preferably from 50 to 200° C.

A cured product of the polysiloxane composition of the present invention preferably has a coefficient of linear expansion at 30 to 300° C. of $100 \times 10^{-6}$/K or less, more preferably $80 \times 10^{-6}$/K or less, even more preferably $70 \times 10^{-6}$/K or less, and further preferably $50 \times 10^{-6}$/K or less. Here, the coefficient of linear expansion is measured using the method stipulated in JIS K 7197. Therefore, the cured product of the present invention has an extremely low coefficient of thermal expansion.

When measured in accordance with ASTM D2240 using a type D Asker hardness tester, a cured product of the polysiloxane composition of the present invention preferably has hardness of 20 or greater, more preferably 30 or greater, even more preferably 40 or greater, and particularly preferably 50 or greater. Therefore, the cured product of the present invention has a satisfactory hardness.

In addition, a cured product of the polysiloxane composition of the present invention exhibits good adhesion to a variety of substrates.

INDUSTRIAL APPLICABILITY

The polysiloxane composition of the present invention has good processability due to having a low viscosity, and can provide a hard cured product having an extremely low coefficient of thermal expansion after curing. Therefore, the cured product of the present invention can be continuously used for a long period of time even in an environment where temperatures exceed 200° C., does not peel from a substrate and the like, and therefore is useful as an adhesive or sealing agent for a variety of optical, electrical and electronic components and is suitable for sealing a semiconductor, and particularly suitable for sealing a power semiconductor.

EXAMPLES

Hereinafter, the present invention will be described in detail based on Practical Examples and Comparative Examples. However, the present invention is not limited to these Practical Examples.

The polysiloxane components used in Practical Examples 1 to 9 and Comparative Examples 1 to 5, the content of vinyl groups and hydrogen atoms therein, and viscosities are as shown in Table 1 and Table 2. However, the polysiloxane compositions of Practical Examples 1 to 9 and Comparative Examples 1 to 5 contained polysiloxane solutions of chloroplatinic acid-vinylsiloxane complexes (platinum content: 0.2 wt. %) as hydrosilylation reaction catalysts at quantities such that the content of platinum in the polysiloxane composition was from 10 to 15 ppm.

Polysiloxane A1 was a polydimethylsiloxane capped at both molecular terminals with dimethylvinylsiloxy groups (Practical Examples 1 to 5 and 7 to 9 and Comparative Examples 1 and 3 to 5) or a copolymer of dimethylsiloxane and methylsilsesquioxane capped at molecular terminals with dimethylvinylsiloxy groups (Practical Example 6 and Comparative Example 2).

Polysiloxane A2 was a copolymer of methylvinylsiloxane and dimethylsiloxane capped at both molecular terminals with dimethylsilanol groups.

Polysiloxane B was a copolymer of methylhydrogensiloxane and dimethylsiloxane capped at both molecular terminals with trimethylsilyl groups.

Adhesion-imparting agent E was a copolymer of methylvinylsiloxane and dimethylsiloxane capped at both molecular terminals with glycidoxypropylmethoxysilyl groups.

Metal oxide particles D were the following particles.

Microparticles D1: MSS-7LV (Silica), manufactured by Tatsumori Ltd.

Average diameter: 9 μm, major axis to minor axis ratio: 1.05, contains no particles having diameters of 50 μm or greater Microparticles D2: FEB24D1(G) (silica), manufactured by Admatechs Company Limited Average diameter: 11 μm, major axis to minor axis ratio: 1.05, contains no particles having diameters of 50 μm or greater Microparticles D3: DAW-07 (alumina), manufactured by Denki Kagaku Kogyo Kabushiki Kaisha Average diameter: 9 μm, major axis to minor axis ratio: 1.1, contains 4 wt. % of particles having diameters of 50 μm or greater Microparticles D4: MIN-U-SIL 10 (silica), manufactured by US Silica Average diameter: 10 μm, major axis to minor axis ratio: 3.0 (non-spherical), contains no particles having diameters of 50 μm or greater The viscosity of the polysiloxane compositions was measured at 25° C. in accordance with JIS K7117-2 using an AR2000EX (manufactured by TA Instruments) at a shear rate of 10 $s^{-1}$.

The coefficient of linear expansion of the cured polysiloxane products was measured in accordance with JIS K 7197 using a TM 9200 (manufactured by Ulvac-Riko, Inc.) at temperatures from 30 to 300° C.

The hardness of the cured polysiloxane products was measured in accordance with ASTM D2240 using a type D Asker hardness tester.

The adhesion of the cured polysiloxane products was obtained by measuring adhesive strength to an alumina heat-dissipating substrate of a cured product at a circular bonding site having an area of 50 $mm^2$ using a Model SS-100KP bond tester (manufactured by Seishin Trading Co., Ltd.).

Practical Examples 1 to 9

Polysiloxane A and metal oxide particles D were mixed using a planetary centrifugal mixer and heated at 150° C. for 30 minutes. The obtained mixture and the remaining components were thoroughly mixed so as to prepare the polysiloxane compositions of Practical Examples 1 to 9. The value of [the number of moles of hydrogen atoms in the polysiloxane (B)]/[the number of moles of the alkenyl groups in the polysiloxane (A)] in the compositions was 1.3. As shown in Table 1, the compositions of Practical Examples 1 to 9 all had viscosities of 200 Pa·s or less, and were confirmed as exhibiting good fluidity. In addition, the compositions of Practical Examples 1 to 9 were cured by being heated at 200° C. for 90 minutes, thereby obtaining hard white solids. In addition, the coefficients of linear expansion of the cured products of Practical Examples 1 to 9 were measured and, as shown in Table 1, all found to be $80 \times 10^{-6}$ $K^{-1}$ or less, thereby indicating low thermal expansion. Furthermore, the hardnesses of the cured products of Practical Examples 1 to 9 were measured and all found to be 20 or greater, thereby indicating good hardness.

Comparative Examples 1 to 5

Polysiloxane compositions were prepared in the same manner as Practical Examples 1 to 9. Compositions in which the value of [the weight fraction of the alkenyl groups in the polysiloxane]×[the weight fraction of the hydrogen atoms] was less than 0.04 (Comparative example 1) or exceeded 8 (Comparative Example 2), a composition in which the content of metal oxide particles D was low (Comparative Example 3), a composition in which non-spherical metal oxide particles D were used (Comparative Example 4) and a composition in which the content of silicon-bonded alkenyl groups in an organopolysiloxane containing silicon-bonded unsaturated aliphatic groups was less than 0.5 wt. % (Comparative Example 5) exhibited poor heat resistance or workability due to exhibiting excessively high coefficient of linear expansion or viscosity or provided brittle cured products from which samples could not be produced.

TABLE 1

|  | Practical Example 1 | Practical Example 2 | Practical Example 3 | Practical Example 4 |
|---|---|---|---|---|
| (A1) Polysiloxane (wt. %) | 7.7 | 7.7 | 7.8 | 3.6 |
| Vinyl group content (wt. %) | 0.5 | 0.5 | 1 | 0.5 |
| Viscosity (Pa · s) | 0.4 | 0.4 | 0.1 | 0.4 |
| (A2) Polysiloxane (wt. %) | 0.2 | 0.2 | — | 3.6 |
| Vinyl group content (wt. %) | 11 | 11 | — | 11 |
| Viscosity (Pa · s) | 0.02 | 0.02 | — | 0.02 |
| Vinyl group content (wt. %) after mixing (A1) + (A2) | 0.77 | 0.77 | 1 | 5.75 |
| Viscosity (Pa · s) after mixing (A1) + (A2) | 0.3 | 0.3 | 0.1 | 0.1 |
| (B) Polysiloxane (wt. %) | 1.1 | 1.1 | 1.2 | 2.8 |
| Hydrogen atom content (wt. %) | 0.76 | 0.76 | 0.76 | 0.76 |
| Viscosity (Pa · s) | 0.01 | 0.01 | 0.01 | 0.01 |
| (D) Metal oxide (type) | D1 | D2 | D2 | D1 |
| Weight (wt. %) | 89.0 | 89.0 | 89.0 | 89.0 |
| Volume (v %) | 79 | 79 | 79 | 79 |
| (E) Adhesion-imparting agent (wt. %) | 2.0 | 2.0 | 2.0 | 1.0 |
| Vinyl group content (wt. %) | 5.3 | 5.3 | 5.3 | 5.3 |
| Viscosity (Pa · s) | 70 | 185 | 35 | 48 |
| Coefficient of linear expansion (×10$^{-6}$/K) | 49 | 37 | 30 | 22 |
| Hardness (type D) | 50 | 55 | 65 | 70 |
| Adhesive strength (MPa) | 6 | 5 | 3 | 1 |

|  | Practical Example 5 | Practical Example 6 | Practical Example 7 | Practical Example 8 | Practical Example 9 |
|---|---|---|---|---|---|
| (A1) Polysiloxane (wt. %) | 7.0 | 7.7 | 3.65 | 1.75 | 6.8 |
| Vinyl group content (wt. %) | 0.5 | 0.31 | 0.09 | 0.5 | 0.5 |
| Viscosity (Pa · s) | 0.4 | 0.6 | 38 | 0.4 | 0.4 |
| (A2) Polysiloxane (wt. %) | 2.3 | — | 3.65 | 1.75 | 8.3 |
| Vinyl group content (wt. %) | 11 | — | 11 | 11 | 11 |
| Viscosity (Pa · s) | 0.02 | — | 0.02 | 0.02 | 0.02 |
| Vinyl group content (wt. %) after mixing (A1) + (A2) | 3.1 | 0.31 | 5.55 | 5.75 | 6.27 |
| Viscosity (Pa · s) after mixing (A1) + (A2) | 0.2 | 0.6 | 10 | 0.1 | 0.07 |
| (B) Polysiloxane (wt. %) | 1.7 | 2.3 | 2.7 | 1.5 | 5.9 |
| Hydrogen atom content (wt. %) | 0.76 | 0.16 | 0.76 | 0.76 | 0.76 |
| Viscosity (Pa · s) | 0.01 | 0.02 | 0.01 | 0.01 | 0.01 |
| (D) Metal oxide (type) | D1 | D1 | D1 | D3 | D1 |
| Weight (wt. %) | 89.0 | 89.0 | 89.0 | 94.0 | 78.0 |
| Volume (v %) | 79 | 79 | 79 | 80 | 62 |
| (E) Adhesion-imparting agent (wt. %) | — | 1.0 | 1.0 | 1.0 | 1.0 |
| Vinyl group content (wt. %) | — | 5.3 | 5.3 | 5.3 | 5.3 |
| Viscosity (Pa · s) | 95 | 125 | 110 | 50 | 4 |
| Coefficient of linear expansion (×10$^{-6}$/K) | 20 | 60 | 15 | 18 | 66 |
| Hardness (type D) | 67 | 25 | 68 | 70 | 25 |
| Adhesive strength (MPa) | 1 | 6 | 1 | 1 | 3 |

TABLE 2

|  | Comparative Example 1 | Comparative Example 2 | Comparative Example 3 | Comparative Example 4 | Comparative Example 5 |
|---|---|---|---|---|---|
| (A1) Polysiloxane (wt. %) | 4.2 | — | 10.0 | 7.7 | 6.4 |
| Vinyl group content (wt. %) | 0.5 | — | 0.5 | 0.5 | 0.3 |
| Viscosity (Pa · s) | 0.4 | — | 0.4 | 0.4 | 0.6 |
| (A2) Polysiloxane (wt. %) | — | 5.9 | 10.0 | 0.2 | — |
| Vinyl group content (wt. %) | — | 11 | 11 | 11 | — |
| Viscosity (Pa · s) | — | 0.02 | 0.02 | 0.02 | — |

TABLE 2-continued

|  | Comparative Example 1 | Comparative Example 2 | Comparative Example 3 | Comparative Example 4 | Comparative Example 5 |
|---|---|---|---|---|---|
| Vinyl group content (wt. %) after mixing (A1) + (A2) | 0.5 | 11 | 5.75 | 0.77 | 0.6 |
| Viscosity (Pa·s) after mixing (A1) + (A2) | 0.4 | 0.02 | 0.1 | 0.3 | 0.3 |
| (B) Polysiloxane (wt. %) | 5.8 | 4.1 | 7.0 | 1.1 | 3.6 |
| Hydrogen atom content (wt. %) | 0.06 | 0.76 | 0.76 | 0.76 | 0.10 |
| Viscosity (Pa·s) | 0.05 | 0.01 | 0.01 | 0.01 | 0.05 |
| (D) Metal oxide (type) | D1 | D1 | D1 | D4 | D1 |
| Weight (wt. %) | 89.0 | 89.0 | 72.0 | 89.0 | 89.0 |
| Volume (v %) | 79 | 79 | 54 | 79 | 79 |
| (E) Adhesion-imparting agent (wt. %) | 1.0 | 1.0 | 1.0 | 2.0 | 1.0 |
| Vinyl group content (wt. %) | 5.3 | 5.3 | 5.3 | 5.3 | 5.3 |
| Viscosity (Pa·s) | 115 | 30 | 2 | Solid | 120 |
| Coefficient of linear expansion (×10$^{-6}$/K) | 85 | NA | 120 | NA | 85 |
| Hardness (type D) | 10 | NA | 5 | NA | 18 |
| Adhesive strength (MPa) | 7 | NA | 1 | NA | 7 |

NA: Not measurable

The invention claimed is:

1. A polysiloxane composition comprising:
(A) at least one type of organopolysiloxane that contains at least two unsaturated aliphatic hydrocarbon groups in the molecule,
(B) at least one type of organohydrogenpolysiloxane that contains at least two silicon-bonded hydrogen atoms in the molecule,
(C) a hydrosilylation reaction catalyst, and
(D) inorganic particles in an amount of from 75 to 95 wt. % based on the total weight of the composition, said inorganic particles comprising 90% by weight or greater of silica and having a major axis to minor axis ratio of 1 to 1.2 and in which the proportion of particles having a diameter of 50 μm or greater is 5 wt. % or less of the total quantity of particles,
wherein
a weight fraction of the unsaturated aliphatic hydrocarbon groups in the organopolysiloxane (A) is from 1 to 7 wt. %,
a compounding ratio of the inorganic particles (D) in the polysiloxane composition is from 70 to 85 vol. %,
a value of [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.04 to 8,
a viscosity of the polysiloxane composition at 25° C. is 500 Pa·s or less, and
the polysiloxane composition provides a cured product having a coefficient of linear expansion at 30 to 300° C. of 80×10$^{-6}$/K or less.

2. The polysiloxane composition according to claim 1, wherein the viscosity of the organopolysiloxane (A) at 25° C. is from 0.05 to 20 Pa·s.

3. The polysiloxane composition according to claim 1, wherein the weight fraction of the silicon-bonded hydrogen atoms in the organohydrogenpolysiloxane (B) is 0.1 wt. % or greater.

4. The polysiloxane composition according to claim 1, wherein the viscosity of the organohydrogenpolysiloxane (B) at 25° C. is 0.1 Pa·s or less.

5. The polysiloxane composition according to claim 1, wherein the value of [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.1 to 7.

6. The polysiloxane composition according to claim 1, wherein the value of [the weight fraction of the unsaturated aliphatic hydrocarbon groups in the organopolysiloxane (A)]×[the weight fraction of the silicon-bonded hydrogen atoms in the organohydrogenpolysiloxane (B)] is from 0.5 to 4.5.

7. The polysiloxane composition according to claim 1, wherein a value of [the number of moles of the silicon-bonded hydrogen atoms in the organohydrogenpolysiloxane (B)]/[the number of moles of the unsaturated aliphatic hydrocarbon groups in the organopolysiloxane (A)] is from 0.5 to 1.5.

8. The polysiloxane composition according to claim 1, wherein the hydrosilylation reaction catalyst (C) is a platinum metal-type catalyst.

9. The polysiloxane composition according to claim 1, comprising at least one type of adhesion-imparting agent (E).

10. The polysiloxane composition according to claim 1, which does not contain a solvent.

11. The polysiloxane composition according to claim 1, which provides a cured product having a coefficient of linear expansion at 30 to 300° C. of 50×10$^{-6}$/K or less.

12. A cured product obtained by curing the polysiloxane composition described in claim 1.

13. The polysiloxane composition according to claim 2, wherein the weight fraction of the silicon-bonded hydrogen atoms in the organohydrogenpolysiloxane (B) is 0.1 wt. % or greater.

14. A cured product as set forth in claim 12 having a coefficient of linear expansion at 30 to 300° C. of 30×10$^{-6}$/K or less.

* * * * *